US007879268B2

(12) United States Patent
Kinoshita et al.

(10) Patent No.: US 7,879,268 B2
(45) Date of Patent: Feb. 1, 2011

(54) APPARATUS AND METHOD FOR MANUFACTURING PARTICULATE RESIN

(75) Inventors: Naotoshi Kinoshita, Numazu (JP); Tetsuya Tanaka, Shizuoka (JP); Masahiro Kawamoto, Shizuoka (JP)

(73) Assignee: Ricoh Company Limited, Tokyo (JP)

( * ) Notice: Subject to any disclaimer, the term of this patent is extended or adjusted under 35 U.S.C. 154(b) by 608 days.

(21) Appl. No.: 11/938,344

(22) Filed: Nov. 12, 2007

(65) Prior Publication Data

US 2008/0122132 A1 May 29, 2008

(30) Foreign Application Priority Data

Nov. 10, 2006 (JP) ............................. 2006-305116
Oct. 12, 2007 (JP) ............................. 2007-266525

(51) Int. Cl.
*B29B 9/00* (2006.01)
(52) U.S. Cl. ............................................ 264/12; 425/7
(58) Field of Classification Search .................. 264/12; 425/7
See application file for complete search history.

(56) References Cited

U.S. PATENT DOCUMENTS

| 3,615,995 | A | | 10/1971 | Buntin et al. | |
|---|---|---|---|---|---|
| 3,684,415 | A | | 8/1972 | Buntin et al. | |
| 3,771,929 | A | * | 11/1973 | Hellman et al. | 425/7 |
| 4,597,919 | A | * | 7/1986 | Ramser et al. | 75/339 |
| 4,787,935 | A | * | 11/1988 | Eylon et al. | 75/338 |
| 4,919,854 | A | * | 4/1990 | Walz | 264/12 |
| 5,196,049 | A | * | 3/1993 | Coombs et al. | 75/338 |
| 5,993,943 | A | | 11/1999 | Bodaghi et al. | |
| 6,001,303 | A | | 12/1999 | Haynes et al. | |
| 6,395,443 | B2 | | 5/2002 | Kuroda et al. | |
| 2002/0117782 | A1 | | 8/2002 | Haynes et al. | |
| 2003/0178514 | A1 | | 9/2003 | Makino et al. | |
| 2006/0032952 | A1 | | 2/2006 | Kawamoto et al. | |

FOREIGN PATENT DOCUMENTS

| DE | 103 22 460 A1 | 12/2004 |
|---|---|---|
| JP | 63-53006 | 10/1988 |
| JP | 6-138704 | 5/1994 |
| JP | 2003-10666 | 1/2003 |
| JP | 3550109 | 4/2004 |
| JP | 2004-332130 | 11/2004 |
| JP | 2005-4182 | 1/2005 |
| JP | 2005-258394 | 9/2005 |

(Continued)

*Primary Examiner*—Mary Lynn F Theisen
(74) *Attorney, Agent, or Firm*—Oblon, Spivak, McClelland, Maier & Neustadt, L.L.P.

(57) ABSTRACT

An apparatus for manufacturing a particulate resin, including: a fine nozzle opening configured to extrude a melted resin mixture including a resin; an extrusion output control mechanism for controlling an extrusion output of the melted resin mixture; a collision mechanism configured to collide the melted resin mixture extruded from the fine nozzle opening with a high-temperature gas stream having a temperature of not less than a $T_{1/2}$ temperature of the resin, so that the melted resin mixture is granulated to provide a particulate resin; a heat retention mechanism configured to retain the particulate resin in an atmosphere having a temperature of not less than a Tg of the resin for 0.01 to 10 seconds; and a cooling mechanism configured to cool the particulate resin;
and a method for manufacturing a particulate resin using the apparatus.

22 Claims, 4 Drawing Sheets

FOREIGN PATENT DOCUMENTS

| | | |
|---|---|---|
| JP | 2006-72159 | 3/2006 |
| JP | 2006-106235 | 4/2006 |
| JP | 2006-106236 | 4/2006 |
| WO | WO 02/089998 A1 | 11/2002 |
| WO | WO 2005/093138 A1 | 10/2005 |

* cited by examiner

GAS NOZZLE

IVC — NOZZLE OPENING

GAS NOZZLE

NOZZLE OPENING (SLIT-LIKE SHAPE)

GAS NOZZLE

NOZZLE OPENING

GAS NOZZLE

NOZZLE OPENING

VA

APPARATUS AND METHOD FOR MANUFACTURING PARTICULATE RESIN

BACKGROUND OF THE INVENTION

1. Field of the Invention

The present invention relates to an apparatus and method for manufacturing a particulate resin.

2. Discussion of the Background

In the fields of electronic printing and electrophotography, the demand for producing high resolution images has increased in the market recently. In order to improve the resolution of images and characters printed on paper by an electronic device such as a copier and a printer, a toner needs to be a fine particulate resin having a narrow particle diameter distribution. Therefore, it is necessary to improve the technique for forming uniform fine particulate resins. The conventional apparatus for manufacturing a particulate resin used for a toner typically includes (1) a kneading means for kneading a resin with toner components such as a colorant, a charge controlling agent, a release agent, and a hardening agent; (2) a pulverization means for pulverizing the above-kneaded mixture; and (3) a classification means for classifying the above-pulverized mixture. It is difficult to obtain a fine particulate resin having a narrow particle diameter distribution, which has been required in the market, with the above-mentioned conventional apparatus without a classification process. Although such an apparatus may produce a fine particulate resin having an average particle diameter of about 5 to 8 μm, the particle diameter distribution thereof cannot achieve the desired level. This is because the resin tends to be excessively pulverized. In this case, it is necessary to remove a large amount of undesired ultrafine particles so that the particle diameter distribution achieves the desired level.

In attempting to solve the above problems, published unexamined Japanese Patent Application No. (hereinafter referred to as JP-A) 06-138704 discloses an apparatus for manufacturing a particulate resin in which a raw material mixture is extruded from a kneader, then the extruded raw material mixture is drawn by a roller to have a fiber-like shape, and then the fiber-like raw material mixture is cut by a cutter to provide a fine particulate resin. In particular, the resin included in the raw material mixture is kneaded and heated in the kneader, then the melted resin is extruded with a die to have a string-like shape, then the string-like extruded resin is drawn by a roller to have a fiber-like shape and be solidified, and then the solidified fiber-like resin is cut to provide a fine particulate resin having a narrow particle diameter distribution.

However, the above apparatus has the following drawback. If the extruded resin is, for some reason, ruptured when drawn by a roller to have a fiber-like shape, the fiber-like resin cannot be submitted to the next step cutting process. In this case production of the fine particulate resin may be interrupted. Alternatively, fiber-like resins having a variation in diameter are provided, resulting in producing resin particles having large variations in particle diameter. This leads to the deterioration of manufacturing efficiency of a fine particulate resin on a commercial scale. Further, it is difficult to stably provide a fine fiber-like resin having a diameter of not greater than 10 μm on a commercial scale by the above method including drawing a resin by a roller, unless a specific method (e.g., a method for manufacturing a composite fiber having a sea-island structure using a polymer blend including two incompatible polymers, a method for manufacturing a easily-tearable fiber) is used in combination. It may be substantially impossible for the above-mentioned apparatus to stably and efficiently provide fine fibers of a typical resin, which is not optimized for providing fibers.

In attempting to efficiently produce a fine fiber-like resin, JP-A2002-371427 discloses a melt-blow type fiber spinning die for manufacturing a nonwoven fabric. In this apparatus, a melted resin is extruded from a nozzle together with hot air, and then the extruded resin is introduced to a spinning opening together with cold air so that the resin is cooled to become a fiber. Since the resin is drawn immediately after being discharged from the fiber spinning die, the resultant resin particles have little variation in particle diameter even if the resin is ruptured for some reason.

In JP-A 2004-332130, an attempt is made to apply the above-mentioned fiber spinning die to an apparatus in which a raw material mixture of a toner having a fiber-like shape. In other words, operating and setup conditions of the fiber spinning die for manufacturing a toner are mentioned therein. In particular, the optimum conditions of cooling mechanism, operating temperature, air content for drawing, etc. are disclosed therein.

JP-A 2006-106235 discloses a toner manufacturing apparatus, having a configuration similar to the apparatus disclosed in JP-A 2004-332130, including a melt-mixing part configured to melt-mix a plurality of raw materials of a toner and a fining part configured to produce fine particles of the melt-mixed raw materials, and further including a static mixer configured to keep the mixed state of the melt-mixed raw materials until transported to the fining part.

JP-A 2006-106236 discloses a toner manufacturing method including forming a fiber-like raw material mixture of a toner and cutting the fiber-like raw material mixture to provide the toner, further including controlling the shape of the resultant toner.

In the techniques disclosed in JP-A's 06-138704, 2004-332130, 2006-106235, and 2006-106236, raw materials of a toner are previously well mixed before being subjected to the cutting or pulverizing process so that the resultant toner has a narrow particle diameter distribution. In these cases, the fiber-like raw material mixture is cut or pulverized using a secondary device to provide a fine particulate resin. In other words, these toner manufacturing processes include a fiber spinning process instead of a classification process. Therefore, these toner manufacturing processes do not contribute to simplifying the toner manufacturing process.

Published examined Japanese Patent Application No. (hereinafter referred to as JP-B) 63-053006 discloses an apparatus for manufacturing a fine particulate resin in which a solvent solution of a resin is sprayed and dried so that the resultant fine particulate resin is directly obtained without the pulverization or cutting process. However, solvents potentially have a danger of explosion and are harmful for humans. In addition, solvents tend to produce VOCs, resulting in polluting the environment.

JP-A 2005-004182 discloses a toner manufacturing method including pulverizing a kneaded raw material mixture of a toner having bubbles. It is described therein that this method improves the pulverization efficiency and prevents production of ultrafine particles. However, this method, which may belong to the category of pulverization methods, does not solve the problem of improving the circularity of the resultant toner (i.e., producing a spherical toner).

JP-A 2005-258394 discloses a toner manufacturing method including melting a kneaded raw material mixture of a toner and spraying the melted raw material mixture with a high-pressure gas so that fine particles of the toner are produced. This method does not need to include any of the drying process (i.e., solvent removing process), the cutting or pulverization process, or the classification process, and is capable of directly producing toner particles from the melted raw material mixture. However, no mention is made about the optimum conditions of the apparatus and means for scale-up.

For example, although the optimum method and device for supplying the high-pressure gas for spraying are mentioned, no mention is made about the method and device (i.e., nozzle) for supplying the melted raw material mixture. No mention is also made about means for scale-up. Although means for preventing secondary aggregation of particles is mentioned, no mention is made about means for improving the circularity of the primary particles, which is one of the most important requirements for toners recently.

SUMMARY OF THE INVENTION

Accordingly, an object of the present invention is to provide an apparatus and method capable of efficiently producing a fine particulate resin which may be used for a toner having a circularity of not less than 0.95 and a weight average particle diameter of not greater than 10 μm.

These and other objects of the present invention, either individually or in combinations thereof, as hereinafter will become more readily apparent can be attained by an apparatus for manufacturing a particulate resin, comprising:

a fine nozzle opening configured to extrude a melted resin mixture comprising a resin;

a means for controlling an extrusion output of the melted resin mixture;

a collision mechanism configured to collide the melted resin mixture extruded from the fine nozzle opening with a high-temperature gas stream having a temperature of not less than a $T_{1/2}$ temperature of the resin, so that the melted resin mixture is granulated to provide a particulate resin;

a heat retention mechanism configured to retain the particulate resin in an atmosphere having a temperature of not less than a Tg of the resin for 0.1 to 10 seconds; and a cooling mechanism configured to cool the particulate resin;

and a method for manufacturing a particulate resin using the above apparatus.

BRIEF DESCRIPTION OF THE DRAWINGS

These and other objects, features and advantages of the present invention will become apparent upon consideration of the following description of the preferred embodiments of the present invention taken in conjunction with the accompanying drawings, wherein.

DETAILED DESCRIPTION OF THE INVENTION

Figure 1:
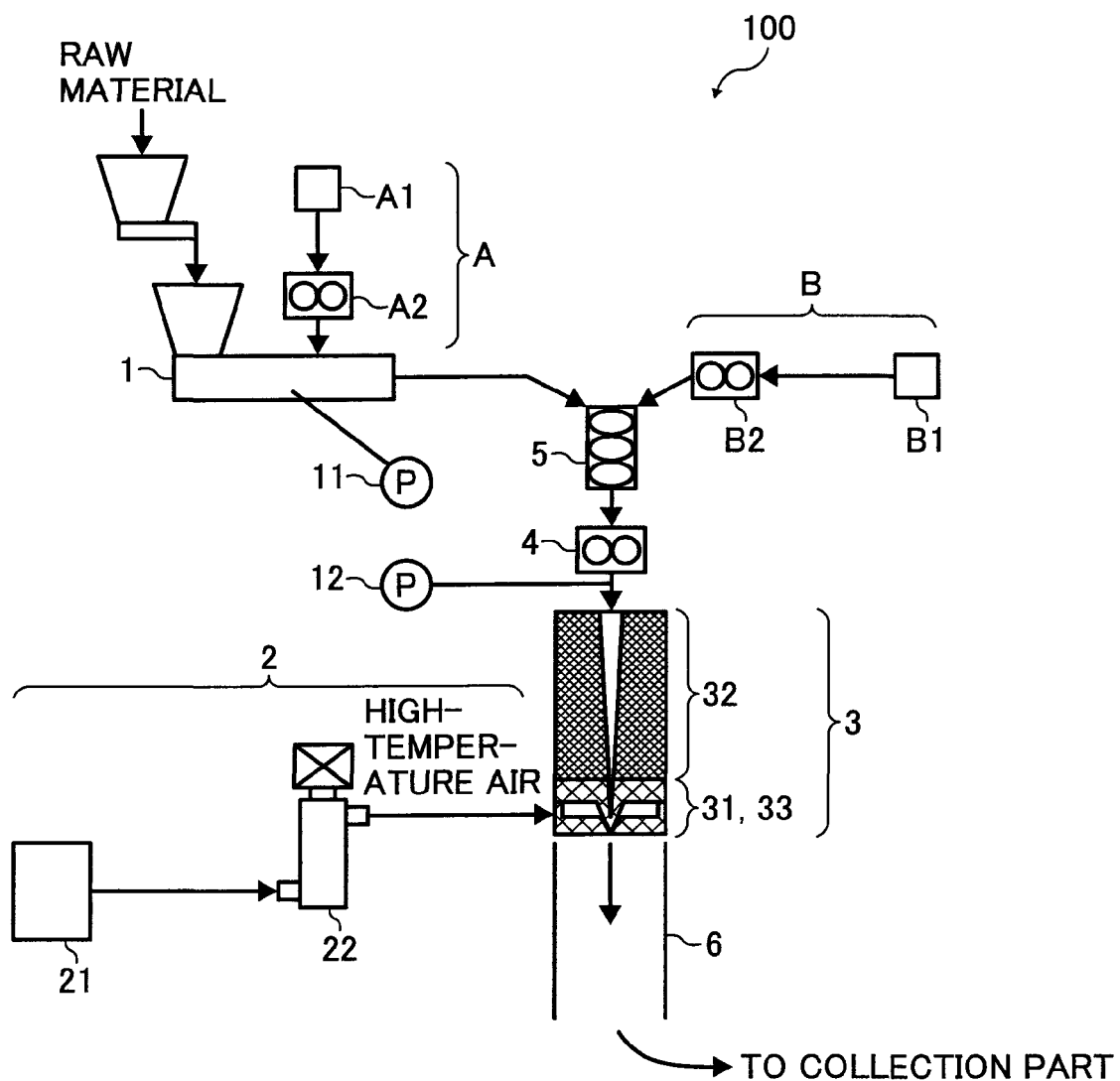
FIG. 1 is a schematic view illustrating an embodiment of the apparatus for manufacturing a particulate resin of the present invention.

FIG. 1 is a schematic view illustrating an embodiment of the apparatus for manufacturing a particulate resin of the present invention.

By extruding a fluidized raw material resin from a fine nozzle opening, formation of fine particles (this phenomenon may be hereinafter referred to as "atomization") of the raw material resin is accelerated upon collision with a high-temperature gas stream. The nozzle opening preferably has a fine circular shape or a fine slit-like shape. By exposing the atomized raw material resin to a high-temperature atmosphere for a specific time after being extruded from the nozzle opening, a particulate resin having a higher circularity can be obtained. The atomization process of a resin fluid is as follows: the resin fluid firstly becomes a film-like shape by application of a shearing force, then the film is secondly split into liquid columns or liquid threads (i.e., fibers) due to continuous application of a shearing force and the surface tension of the fluid, and then the liquid columns and threads are divided into liquid droplets due to continuous application of a shearing force and the surface tension of fluid. The resin fluid, which is to become droplets, is preferably in as fine a form as possible, such as fine liquid columns, threads, and films, before applying a shearing force thereto. Thereby, the atomization is accelerated when the shearing force is applied. As a means for atomization (i.e., spraying), a two fluid spray nozzle and any known derivatives thereof can be used.

(High-Temperature Gas Stream and High-Temperature Atmosphere)

The present invention provides a particulate resin, such as a toner, having a high circularity by finely dispersing a raw material resin using a high-temperature gas stream.

In the present invention, the high-temperature gas stream has a temperature of not less than the $T_{1/2}$ temperature (which will be explained in detail later) of the resin. The resin can be thereby prevented from cooling and given a dispersing force while being fluid (liquid). Considering deterioration of the resin, the high-temperature gas stream preferably has a temperature of not greater than 2.5 times the $T_{1/2}$ temperature of the resin, and more preferably not greater than twice the $T_{1/2}$ temperature of the resin.

A resin fluid may be typically solidified in the form of liquid threads being on the division process or short fibers, when immediately cooled after the atomization. In this case, the liquid threads or short fibers may be exposed to a specific high-temperature atmosphere for a specific time to have spherical shapes.

The high-temperature atmosphere is an atmosphere having a temperature at which a resin is easily transformable compared to at a room-temperature atmosphere. In an atmosphere having a low temperature at which a resin is not transformable, the atomized resin is immediately cooled and solidified. Therefore, particles having a high circularity cannot be obtained. As the temperature at which a resin is easily transformable, for example, the glass transition temperature (Tg) of the resin can be adopted. As a temperature at which a resin is fluidized, the $T_{1/2}$ temperature of the resin can be adopted.

In the present invention, the high-temperature atmosphere typically has a temperature of not less than the glass transition temperature (Tg) of the resin, and preferably not less than the $T_{1/2}$ temperature of the resin. Considering deterioration of the resin, the high-temperature atmosphere preferably has a temperature of not greater than 2.5 times the $T_{1/2}$ temperature of the resin, and more preferably not greater than twice the $T_{1/2}$ temperature of the resin. The resin can be thereby softened in the process of transformation, resulting in formation of a particulate resin having a high circularity.

The exposure time to the high-temperature atmosphere is at least 0.1 seconds and preferably not less than 0.5 seconds. However, it is unfavorable to excessively expose the resin to the high-temperature atmosphere, because the resin deteriorates. Therefore, the exposure time is preferably not greater than 10 seconds.

The $T_{1/2}$ temperature can be determined from a flow curve obtained by a CFT-500D flowtester (from Shimadzu Corporation).

Figure 2:
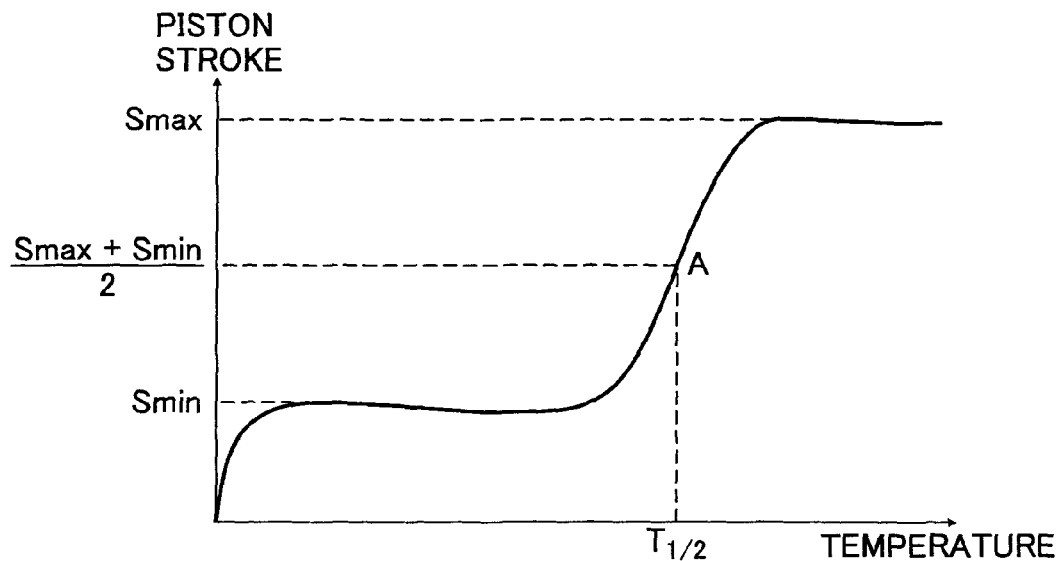
FIG. 2 is an example flow curve obtained by a flowtester to explain how to determine the $T_{1/2}$ temperature.

FIG. 2 is an example flow curve obtained by the CFT-500D flowtester. The X-axis represents temperature and the Y-axis represents a piston stroke. As illustrated in FIG. 2, a value of a point A on the Y-axis is the midpoint between Smax and Smin. A value of the point A on the X-axis is defined as the $T_{1/2}$ temperature in the present invention.

The measurement conditions are as follows:
Test pressure: 30 kg/cm$^2$
Temperature rising rate: 3.0° C./min
Die orifice diameter: 0.50 mm
Die length: 1.0 mm The glass transition temperature (Tg) can be determined by a differential scanning calorimeter DSC-60 equipped with a thermal analysis workstation TA-60WS (both from Shimadzu Corporation).

The measurement conditions are as follows:
Sample container: Aluminum sample pan (with a lid)
Sample quantity: 5 mg
Reference: Aluminum sample pan (containing 10 mg of alumina)
Atmosphere: Nitrogen (flow rate: 50 ml/min)
Temperature conditions:
Start temperature: 20° C.
Temperature rising rate: 1° C./min
End temperature: 150° C.
Retention time: None
Temperature falling rate: 10° C./min
End temperature: 20° C.
Retention time: None
Temperature rising rate: 10° C./min
End temperature: 150° C.

Measurement results are analyzed using data analysis software TA-60 version 1.52 (from Shimadzu Corporation). At first, a DrDSC curve, which is a differential curve of a DSC curve obtained in the second temperature rising scan, is analyzed using a peak analysis function of the software, with specifying a range of −5° C. to +5° C. around the lowest temperature at which a maximum peak is observed, to determine a peak temperature. Next, the DSC curve is analyzed using the peak analysis function of the software, with specifying a range of −5° C. to +5° C. around the peak temperature, to determine a maximum endothermic temperature. The thus obtained maximum endothermic temperature is defined as the glass transition temperature (Tg) in the present invention.

When the raw material resin is a mixture of a plurality of resins, the largest $T_{1/2}$ and the smallest Tg among the resins occupying not less than 10% are adopted as the $T_{1/2}$ and Tg, respectively, in the present invention.

The amount of time a particulate resin is kept in the high-temperature atmosphere is represented by a theoretical time (t) while the particulate resin moves a distance (x) from a point where a cooling-solidifying means is provided or a point where the temperature is less than the desired temperature to the most far point of the particle formation part. The moving speed (v) of the particulate resin is determined by dividing the transfer capacity (V, representing a normal conversion volume) per unit time of a gas stream containing the particulate resin moving from the point where the cooling-solidifying means is provided or the point where the temperature is less than the desired temperature to the most far point of the particle formation part, by the maximum area (s) capable of including the particulate resin and vertical to the line connecting the point where the cooling-solidifying means is provided or the point where the temperature is less than the desired temperature and the most far point of the particle formation part, i.e., v=V/s. Accordingly, the relationship t=x/v is satisfied.

(Particle Diameter and Average Circularity)

The particle diameters of a toner can be measured using a Coulter counter method. For example, measurement instruments such as COULTER COUNTER TA-II and COULTER MULTISIZER III (both from Beckman Coulter K. K.) can be used.

The typical measuring method is as follows:

(1) 0.1 to 5 ml of a polyoxyethylene alkyl ether is included as a dispersant in 100 to 150 ml of an electrolyte (i.e., about 1% NaCl aqueous solution including a first grade sodium chloride such as ISOTON-II from Beckman Coulter K. K.);

(2) 2 to 20 mg of a toner is added to the electrolyte and dispersed using an ultrasonic dispersing machine for about 1 to 3 minutes to prepare a toner suspension liquid;

(3) the volume and the number of toner particles are measured by the above instrument using an aperture of 100 μm to determine volume and number distribution thereof; and (4) the weight average particle diameter (D4) and the number average particle diameter (D1) are determined.

The following 13 channels are used: from 2.00 to less than 2.52 μm; from 2.52 to less than 3.17 μm; from 3.17 to less than 4.00 μm; from 4.00 to less than 5.04 μm; from 5.04 to less than 6.35 μm; from 6.35 to less than 8.00 μm; from 8.00 to less than 10.08 μm; from 10.08 to less than 12.70 μm; from 12.70 to less than 16.00 μm; from 16.00 to less than 20.20 μm; from 20.20 to less than 25.40 μm; from 25.40 to less than 32.00 μm; and from 32.00 to less than 40.30 μm. Namely, particles having a particle diameter of from not less than 2.00 μm to less than 40.30 μm can be measured.

The circularity of a particle is determined by the following equation:

$$\text{Circularity} = Cs/Cp$$

wherein Cp represents the length of the circumference of the image of a particle and Cs represents the length of the circumference of a circle having the same area as that of the image of the particle.

The average circularity of a toner can be measured by a flow-type particle image analyzer FPIA-2100 (from Sysmex Corp.) and analyzed using an analysis software program (FPIA-2100 Data Processing Program for FPIA version 00-10).

The typical measurement method is as follows:

(1) 0.1 to 0.5 ml of a 10% by weight aqueous solution of a surfactant (an alkylbenzene sulfonate NEOGEN® from Daiichi Kogyo Seiyaku Co., Ltd.) is included in a 100 ml glass beaker;

(2) 0.1 to 0.5 g of a toner is added thereto and mixed with a micro spatula, and then 80 ml of ion-exchanged water is further added thereto;

(3) the above-prepared dispersion is dispersed using an ultrasonic dispersing machine (from Honda Electronics Co., Ltd.) for 3 minutes; and (4) the shape and shape distribution of the toner are determined by FPIA-2100 with the dispersion including 5,000 to 15,000 per 1 micro-liter of the toner particles.

(Fine Nozzle Opening)

By making the nozzle opening finer, a resin fluid can be previously divided into small segments. Therefore, formation of fine resin particles (this phenomenon may be hereinafter referred to as "dispersion") can be accelerated in the latter process. Generally, it is difficult to disperse a highly viscous material, such as a resin fluid, to have a desired particle diameter in one step. Even if it is possible, a utility capable of giving a larger dispersion force (such as a high-temperature gas) is needed, resulting in economical inefficiency. When the resin fluid is initially dispersed prior to application of the final dispersing force, the dispersion in the latter process is accelerated. As the fine nozzle opening, a hole having a small diameter, a slit having a narrow clearance, etc., can be used.

By mixing a second substance with a raw material resin before the raw material resin is introduced to the nozzle opening, the atomization can be accelerated. Since the apparatus for manufacturing a particulate resin of the present invention includes a mixer configured to mix the raw material resin and the second substance, bubbles can be uniformly formed in the resin fluid. As a result, the particle diameters of fine particles formed in the latter process can be uniformized.

(Second Substance)

As the second substance, substances capable of decreasing the viscosity of a resin fluid (i.e., capable of increasing dispersibility of a resin fluid by being mixed therewith) can be used.

As the substances capable of decreasing the viscosity of a resin fluid, waxes having a low melting point and a low viscosity are preferably used. Specific examples of such waxes include, but are not limited to, plant waxes (e.g., candelilla wax, carnauba wax, rice wax), mineral waxes (e.g., montan wax, ceresin wax), petroleum waxes (e.g., paraffin wax, petrolatum), synthesized hydrocarbons (e.g., polypropylene, polyethylene), hydrogenated waxes (e.g., hydrogenated castor oil and derivatives thereof), and fatty acid derivatives of alcohols, esters, amides, imides, ketones, and metal soaps. Among these waxes, carnaubawax, ricewax, polyethylene, polypropylene, and montan wax are preferably used.

As another example of the second substance, a gaseous substance can also be used. For example, by finely mixing air with a resin fluid, the resin fluid includes fine bubbles. When a resin fluid includes a large amount of fine bubbles, the resin fluid is in a state which is preliminarily dispersed. In this case, the formation of fine particles in the latter process is much more accelerated. The preliminarily dispersed resin fluid is in a state in that the resin is previously divided into fine segments due to the presence of the bubbles, or in that formation of the resin film (in the atomization) is in process. As the gaseous substance, carbon dioxide, nitrogen gas, and butane gas are preferably used. It is known that butane gas is easily dissolved and dispersed in a resin. Therefore, butane gas is suitable for generating fine bubbles, which are effective for formation of fine particles in the latter process. On the other hand, carbon dioxide and nitrogen are low in price, safe, and inert to resins and do not adversely affect them. It is more preferable that these gases are provided in a supercritical state. In particular, supercritical fluids of carbon dioxide and nitrogen are most preferable. Carbon dioxide becomes supercritical when the temperature is not less than 31.0° C. and the barometric pressure is not less than 72.8 atm. The supercritical fluid has a low viscosity for its higher density compared to gas, and a diffusion coefficient being several hundreds that of liquids. As disclosed in JP-A 2005-004182, bubbles formed with the supercritical fluid by being mixed with or dissolved in a resin are very different from those formed with a typical gas, and have very uniform diameters. It is also disclosed therein that the bubble formed with the supercritical fluid has a thin film thickness of about 2 to 15 μm. In a resin fluid including bubbles formed with the supercritical fluid, thin films having a thickness of about 2 to 15 μm are already prepared. Therefore, the use of the supercritical fluid is very effective for the preliminary dispersion in the present invention.

(Mixing Mechanism of Second Substance)

When the apparatus of the present invention includes a screw-type mixer, the dispersion step may be well performed, resulting in producing particles having a uniform diameter. In addition, when the apparatus of the present invention includes a static mixer, the dispersion step may also be well performed, resulting in producing particles having a uniform diameter. In particular, when a supercritical fluid is mixed using a static mixer, operability increases and the cost is reduced compared to using a screw-type mixer.

As a simple and low-cost mixer, an extruder is preferably used, which is typically used for melting and kneading a resin and is one of the screw-type mixers. The configuration of the extruder is not particularly limited, and may be either single-screw or twin-screw. In order to easily switch the kind of product or to avoid application of an excessive shearing force to a resin, the static mixer is preferably provided in the flow path of the resin fluid leading to a nozzle. In order to make the particle diameter of the dispersed fine particles much more uniform, both of a screw-type mixer and a static mixer may be provided in this order so that the resin fluid is very well mixed and the bubbles are much more uniform.

In particular, a supercritical fluid is preferably mixed using a static mixer. If the supercritical fluid is mixed using a screw-type mixer, complicated pressure control is needed, as disclosed in JP-A 2003-10666, resulting in complicated operability of the apparatus. Further, the interior of the screw-type mixer may need to be modified and specially designed, as disclosed in JP-A 2003-10666, resulting in increasing the cost. On the other hand, the static mixer may be controlled so that the supply pressure (P1) for supplying the first substance to the static mixer in the upstream portion thereof is the same as the supply pressure (P2) for supplying the second substance to the static mixer in the upstream portion thereof. In order to handle a gas in a supercritical state, an apparatus for manufacturing a particulate resin may have a function of providing high-temperature and high-pressure conditions. Any known apparatuses for manufacturing a particulate resin and having a means for providing high-temperature and high-pressure conditions can be used. As the means for providing high-temperature conditions, any known means for heating or retaining heat can be used. As the means for providing high-pressure conditions, any known means for providing high-pressure conditions can be used. Such an apparatus for manufacturing a particulate resin may be formed of a material resistant to high-temperature and high-pressure conditions and may have a design resistant to high-temperature and high-pressure conditions.

By using a gear pump as a means for controlling the extrusion output, fine particles having a very uniform particle diameter can be provided. When an extruder issued, there can be mentioned a method including controlling the rotation number of the extruder and a method including controlling the amount of raw material supplied to the extruder, as a method for controlling the extrusion output. These methods and the gear pump are preferably used in combination in order to control the extrusion output. By making the extrusion output more uniform, the ratio between the high-temperature gas stream and the extrusion output can be maintained at the same level. Therefore, the particle diameter distribution of the fine particles becomes uniform.

By providing a plurality of nozzle openings, the processing capacity can be additively increased. When each of a plurality of the nozzle openings includes a unit for supplying a high-temperature gas stream, the configuration of the apparatus for manufacturing a particulate resin can be simplified and the manufacturing cost can be reduced. When each of a plurality of the nozzle openings are arranged in line, a high-temperature gas stream can be efficiently shared thereamong while the configuration of the apparatus for manufacturing a particulate resin is much more simplified. When each of a plurality of the nozzle openings are arranged in a circle, a high-temperature gas stream can be efficiently shared thereamong while the configuration of the apparatus for manufacturing a particulate resin is much more simplified. These are exemplary embodiments of the arrangement of the nozzle openings in which a high-temperature gas stream can be efficiently shared, and it is to be readily understood that other arrangements of the nozzle openings and high-temperature gas stream can be used and are included within the present invention.

When the nozzle opening has a fine opening diameter (i.e., circle equivalent diameter) of not greater than 500 μm, a resin fluid is initially divided into small segments. Therefore, the dispersion in the latter process can be accelerated. The nozzle opening preferably has an opening diameter (i.e., circle equivalent diameter) of from 100 to 500 μm and more preferably from 150 to 300 μm. The opening diameter of the nozzle opening is preferably as fine as possible. However, if the opening diameter of the nozzle opening is too fine, a larger pressure is needed for the extrusion or the extrusion output decreases when the pressure is constant, resulting in the need for a large amount of power or deterioration of the processing capacity.

The pitch distance of the nozzle openings, i.e., the distance (d) between the centers or barycenters of the nozzle openings is preferably not less than twice the circle equivalent diameter (D) of the nozzle opening, and more preferably not less than three times the circle equivalent diameter (D) of the nozzle opening. In particular, the distance (d) is preferably not less than 500 μm. A process for providing nozzle openings having a circle equivalent diameter of less than 500 μm is attended with some difficulties and is high in cost. Even if the distance (d) is less than three times the circle equivalent diameter (D), the manufacturing efficiency may not be improved because the probability is increased that a droplet formed from a nozzle opening collides with another droplet formed from an adjacent nozzle opening. If the distance (d) is less than twice the circle equivalent diameter (D), not only is the manufacturing efficiency not improved but also the manufacturing cost is increased. Further, the structural strength of a nozzle unit, which is an aggregate of the nozzle openings, is decreased because the distances between each of the nozzle openings are narrowed. As a result, ruptures and cracks tend to be made on the pitch portions.

When the nozzle opening has a slit-like shape having a narrow clearance, thin films of a resin fluid can be initially prepared, and the dispersion in the latter process can be accelerated. By varying the slit width, the manufacturing scale can be easily increased. The slit-like opening preferably has a width of from 50 to 400 μm and more preferably from 80 to 350 μm. The slit width of the slit-like nozzle opening is preferably as fine as possible. However, if the slit width of the slit-like nozzle opening is too fine, higher pressure is needed for the extrusion or the extrusion output decreases when the pressure is constant, resulting in the need of a large amount of power or deterioration of the processing capacity.

When the slit-like nozzle opening has a substantially circular shape, the slit width can be widened while the apparatus remains compact. Therefore, the processing capacity increases while the apparatus remains compact. By blowing off a high-temperature gas stream from the opposing corners, a shearing force is much more uniformly applied to the extruded resin. The slit-like nozzle opening having a substantially circular shape is a preferred embodiment capable of easily increasing the processing capacity and efficiently supplying a high-temperature gas stream to the extruded resin with a simple configuration.

Referring to FIG. 1, an apparatus 100 includes a base compound feeder 1 configured to melt a resin mixture (i.e., base compound), a high-temperature air feed section 2, and an atomization device 3 including a fine nozzle opening.

As the base compound feeder 1, an extruder is preferably used. The extruder may be single-screw or twin-screw. In particular, a twin-screw extruder is more preferably used. The apparatus 100 optionally includes a means for controlling the feed amount of the base compound, such as a gear pump 4. The base compound feeder 1 preferably melts the resin mixture at a temperature of from the Tg to twice the $T_{1/2}$ of the resin. For example, when a toner is manufactured, the resin mixture is preferably melted at a temperature of from 50 to 250° C. and more preferably from 70 to 230° C. The base compound feeder 1 need not to have the same temperature in the former, middle, and the latter processes thereof, i.e., a temperature gradient may be formed, if desired.

The base compound feeder 1 may include a feeder A configured to feed a second substance. The second substance is fed from a feed source A1 having a configuration suitable for feeding the second substance. For example, the feed source A1 can feed a substance such as a wax and a gaseous substance at room temperatures and normal pressures. When the feed source A1 is capable of feeding a gas in supercritical state, the feed source A1 preferably has a resistance to pressure. As the feed source A1, any known feed sources such as a tank, a steel cylinder, or a hopper can be used. The feeder A preferably includes a pump A2 configured to separate a desired amount of the second substance from the feed source A1. As the pump A2, any known pumps such as a screw pump, a gear pump, or a diaphragm pump can be used. Since waxes are typically solid at room temperatures and normal pressures, the feeder A preferably includes a proper heating mechanism when the second substance is a wax. Since the wax preferably has a melt viscosity of not greater than 1,000 mPa·s, the heating mechanism preferably controls the temperature in a range of from 50 to 230° C.

The apparatus 100 may include a static mixer 5 in the latter process of the base compound feeder 1. The static mixer 5 may include a feeder B configured to feed a second substance. The second substance is fed from a feed source B1 having a configuration suitable for feeding the second substance. The feeder B preferably includes a pump B2 configured to separate a desired amount of the second substance from the feed source B1. The feed sources A and B have the same requirements and functions.

The high-temperature air feed section 2 includes an air source 21 and a heater 22 configured to heat the air, and preferably includes a control means for controlling the fed amount of air (not shown). As the air source 21, any known air sources such as a blower and a compressor can be used. As the heater 22, any known heaters such as an electric heater and a gas heater can be used. The heater 22 preferably includes a means for controlling the temperature. The high-temperature air preferably has a temperature of from the $T_{1/2}$ to 3.5 times the Tfb (i.e. the flow beginning temperature) of the resin. When a toner is manufactured, the high-temperature air preferably has a temperature of from 100 to 350° C. and more preferably from 150 to 330° C.

The atomization device 3 includes a nozzle unit 31 including a fine nozzle opening, a distribution unit 32 configured to feed a raw material to the nozzle opening, and an air unit 33 configured to feed a high-temperature air. As a means for atomizing, any known double-fluid spray nozzles and any known atomizing methods can be used. The exemplary embodiments of the nozzle unit 31 and the air unit 33 are illustrated in FIGS. 3 to 5. The atomization device 3 is preferably controlled to have a temperature of from the $T_{1/2}$ to three times the $T_{1/2}$ of the resin. When a toner is manufactured, the atomization device 3 preferably has a temperature of from 100 to 300° C. and more preferably from 150 to 250° C.

Figure 3A:
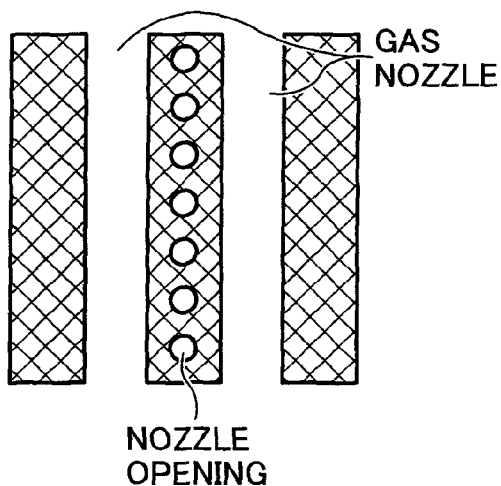
FIGS. 3A and 3B are schematic bottom and cross-sectional views, respectively, illustrating an embodiment of a nozzle unit used for the apparatus for manufacturing a particulate resin in the present invention.
Figure 3B:
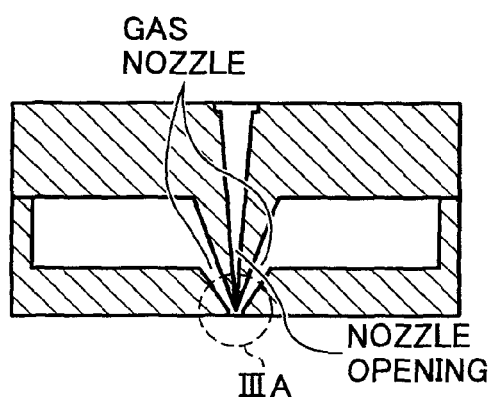

FIGS. 3A and 3B are schematic bottom and cross-sectional views, respectively, illustrating an embodiment of the nozzle unit 31 of the atomization device 3 used for the apparatus for manufacturing a particulate resin of the present invention. In this embodiment, nozzle openings are arranged in line at specific intervals, and gas nozzles having a slit-like shape are provided in parallel across the nozzle openings.

Figure 4A:
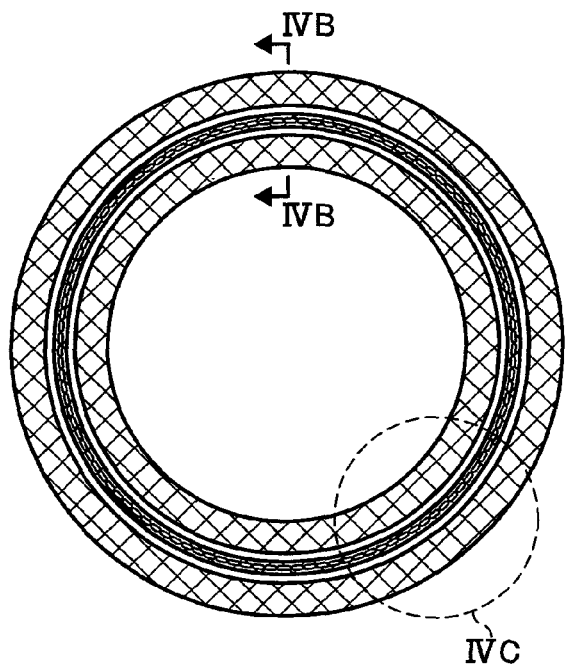
FIGS. 4A, 4B, and 4C are schematic bottom, cross-sectional, and magnified views, respectively, illustrating another embodiment of a nozzle unit used for the apparatus for manufacturing a particulate resin in the present invention.
Figure 4B:
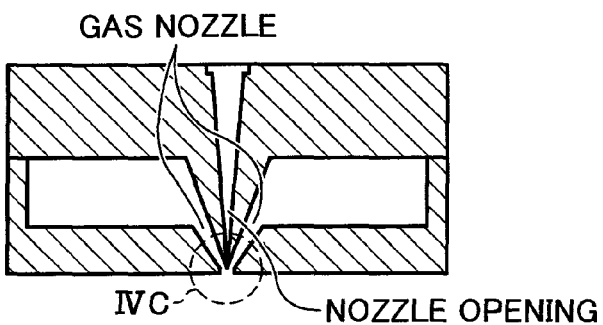
Figure 4C:
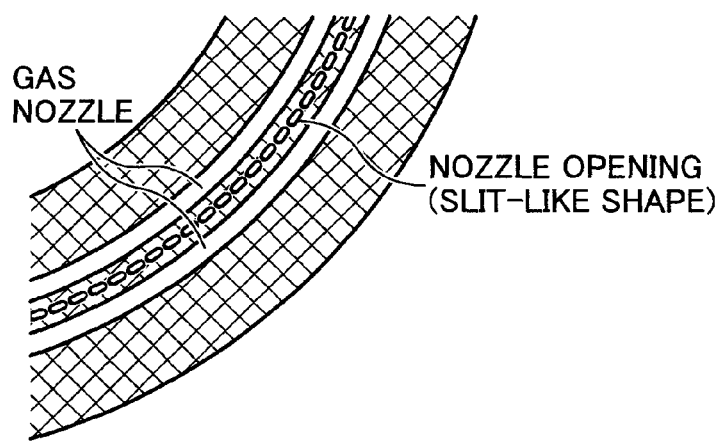

FIGS. 4A and 4B are schematic bottom and cross-sectional views, respectively, illustrating another embodiment of the nozzle unit 31 of the atomization device 3 used for the apparatus for manufacturing a particulate resin of the present invention. FIG. 4C is a magnified view illustrating an embodiment of the nozzle openings and the gas nozzles illustrated in FIG. 4A. In this embodiment, nozzle openings having an ellipse-like shape, a rectangle-like shape, or a short-slit-like shape are arranged in a circle at specific intervals, and gas nozzles having a ring-like shape are concentrically provided across the nozzle openings.

Figure 5A:
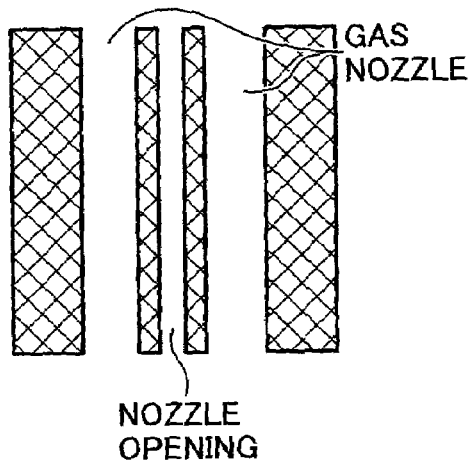
FIGS. 5A and 5B are schematic bottom and cross-sectional views, respectively, illustrating yet another embodiment of a nozzle unit used for the apparatus for manufacturing a particulate resin in the present invention.
Figure 5B:
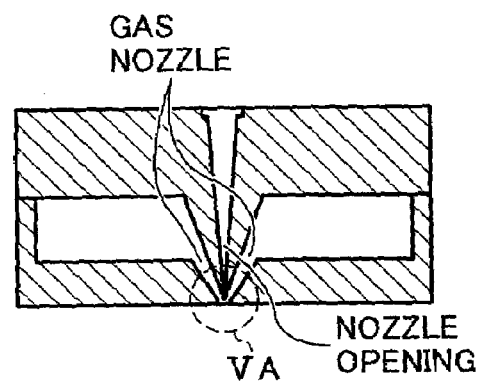

FIGS. 5A and 5B are schematic bottom and cross-sectional views, respectively, illustrating yet another embodiment of the nozzle unit 31 of the atomization device 3 used for the apparatus for manufacturing a particulate resin of the present invention. In this embodiment, the nozzle opening has a slit-like shape, which is a flow path for a resin fluid, and gas nozzles having a slit-like shape are provided in parallel across the slit-like nozzle opening.

The arrangement of the nozzle openings and the gas nozzles are not limited to the embodiments illustrated in FIGS. 3 to 5. For example, a plurality of the nozzle openings arranged in a circle as illustrated in FIG. 4 may be replaced with a slit-like nozzle opening, which is a flow path for a resin fluid, as illustrated in FIG. 5. In contrast, the slit-like nozzle opening, which is a flow path for a resin fluid, illustrated in FIG. 5 may be replaced with a plurality of nozzle openings having an ellipse-like shape, a rectangle-like shape, or a short slit-like shape as illustrated in FIG. 4.

Alternatively, nozzle openings may form an L-shape, an elliptical shape, or a rectangular shape.

In order that each of the nozzle openings and the nozzle units uniformly exerts its ability, the nozzle openings are preferably arranged in a circle or in a line. When a supercritical fluid is used, the atomization device 3 may include a means for controlling a resin pressure applied to the nozzle openings. For example, a pressure control section X may be provided as illustrated in FIG. 1. As the means for controlling a resin pressure, any known resistive body having a mesh-like shape or a slit-like shape can be used. The means for controlling a resin pressure is provided so that a resin pressure is uniformly applied to each of the nozzle openings.

In the apparatus 100 illustrated in FIG. 1, a gas can be kept in a supercritical state even after being mixed with raw materials of a toner. Since the pressure between the extruder (the base compound feeder 1) and the gear pump 4, the pressure between the extruder (the base compound feeder 1) and the pressure control section X, the pressure between the gear pump 4 and the pressure control section X, etc. can be controlled to have a high pressure, the gas can be in a supercritical state at any location. In the latter process of the atomization device 3, a heat retention chamber 6 is provided to retain a high-temperature atmosphere in the apparatus 100. Any known heat retention chambers can be used. In particular, a heat retention chamber capable of controlling the retention time is preferably used. As a means for controlling the retention time, there can be mentioned a means for controlling the amount of air in the chamber, i.e., the wind velocity, a means for changing the angle of the rotational flow of air, etc., but the means for controlling the retention time is not limited thereto.

Figure 6:
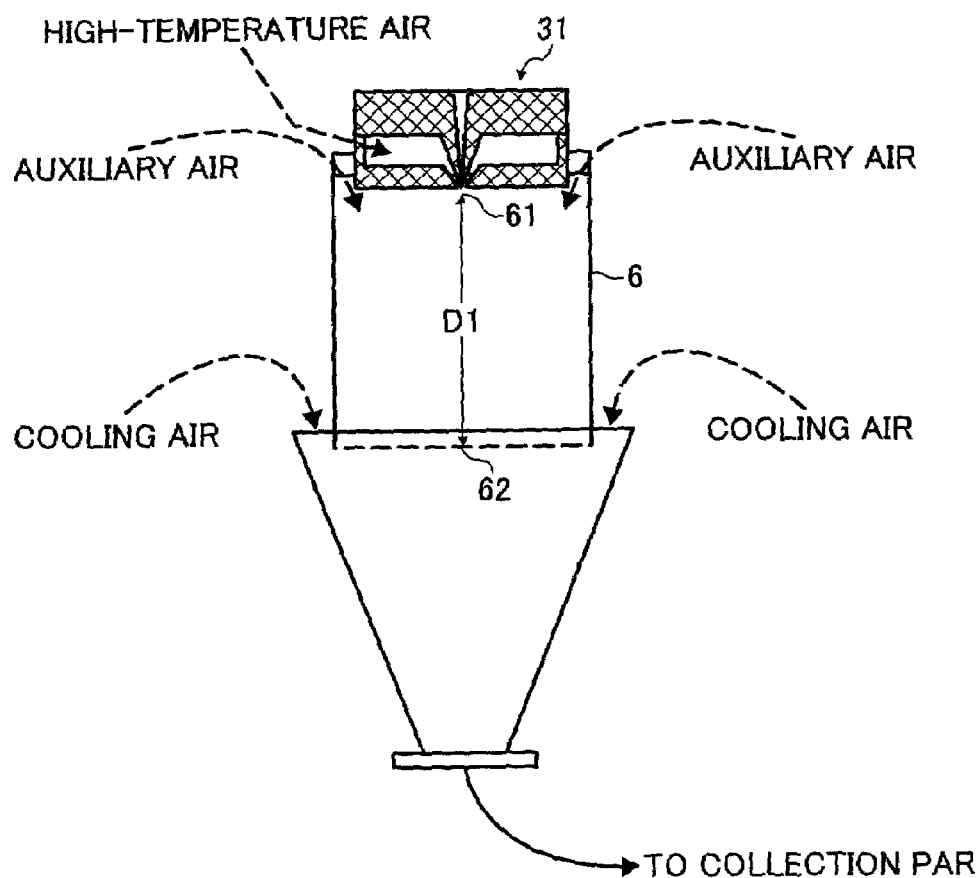
FIG. 6 is a schematic view illustrating an embodiment around the nozzle unit illustrated in FIG. 1.

FIG. 6 is a detailed schematic view illustrating an embodiment around the nozzle unit 31 illustrated in FIG. 1. As illustrated in FIG. 6, an auxiliary air for controlling the temperature of the heat retention chamber 6 and a cooling air configured to cool the resultant particulate resin are provided.

In order to monitor the temperature inside the heat retention chamber 6, temperature sensors may be provided in the vicinity of a collision part 61 where a resin fluid and a gas stream collide with each other, and in the vicinity of an exit 62 of the heat retention chamber 6. A distance D1 between the collision part 61 and the exit 62 is determined so that the resultant particulate resin is held at a temperature of not less than the Tg in the heat retention chamber 6.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Preparation of Raw Material

The following components were pre-mixed using a HENSCHEL MIXER to prepare a raw material (A).

| | |
|---|---|
| Polyester resin (1) ($T_{1/2}$: 107° C., Tg: 64° C.) | 46.75 parts |
| Polyester resin (2) ($T_{1/2}$: 124° C., Tg: 64° C.) | 38.25 parts |
| Polyester resin (3) ($T_{1/2}$: 112° C., Tg: 58° C.) | 10.00 parts |
| Magenta pigment (TOSHIKI RED 1022 from Dainippon Ink and Chemicals, Incorporated) | 6.00 parts |
| Charge controlling agent (BONTRON ® E-304 from Orient Chemical Industries, Ltd.) | 0.50 parts |

The following Examples and Comparative Examples were performed using the raw material (A) prepared above.

Example 1

A nozzle unit (1) including 750 pieces of a circular nozzle opening having an opening diameter of 160 μm was set in the apparatus 100 for manufacturing a particulate resin illustrated in FIG. 1. The pitch distance between the nozzle openings was about 0.6 mm. The nozzle openings were arranged in line and slit-like gas nozzles, configured to provide a high-temperature air, were arranged in parallel across the nozzle openings as illustrated in FIG. 3.

The inner walls of the resin flow paths from the base compound feeder 1 to immediately before the atomization device 3 were controlled to have a temperature of 160° C., and that of the atomization device 3 was controlled to have a temperature of 200° C. The high-temperature air was controlled to have a temperature of 240° C.

The static mixer 5 illustrated in FIG. 1 was replaced with a cylindrical flow path including no intentional resistive body. The gear pump 4 illustrated in FIG. 1 was replaced with a simple cylindrical flow path including no intentional resistive body.

The throughput per nozzle opening of the apparatus 100 was controlled so that pressure gauge 12 indicated a pressure of 3 MPa. (This throughput was regarded as a unit of "raw-material throughput" per nozzle opening.)

The feed quantity of the high-temperature air was controlled so that 75% by weight of the collected resin particles pass through a 400-mesh sieve. (This feed quantity in normal conversion value was regarded as a unit of "air feed quantity".)

In this embodiment, the heat retention chamber 6 had a temperature of from 190 to 210° C. The retention time in the heat retention chamber 6 was about two seconds, determined according to the method defined in the present invention.

After passing the heat retention chamber 6, the collected resin particles were transported with air, while controlled to have a temperature of not greater than 50° C. (the peripheral atmosphere was controlled to have a temperature of not greater than 40° C.), and collected by a dust collector (not shown). The collected resin particles were sieved with a mesh.

Comparative examples 1 to 3

A nozzle unit (1) including 750 pieces of a circular nozzle opening having an opening diameter of 160 μm was set in the apparatus 100 for manufacturing a particulate resin illustrated in FIG. 1. The pitch distance between the nozzle openings was about 0.6 mm. The nozzle openings were arranged in line and slit-like gas nozzles, configured to provide a high-temperature air, were arranged in parallel across the nozzle openings as illustrated in FIG. 3.

The inner walls of the resin flow paths from the base compound feeder 1 to immediately before the atomization device 3 were controlled to have a temperature of 160° C., and that of the atomization device 3 was controlled to have a temperature of 200° C. The high-temperature air was controlled to have a temperature described in Table 1, respectively.

The static mixer 5 illustrated in FIG. 1 was replaced with a cylindrical flow path including no intentional resistive body. The gear pump 4 illustrated in FIG. 1 was replaced with a simple cylindrical flow path including no intentional resistive body.

The throughput per nozzle opening was controlled to one unit of "raw-material throughput". The feed quantity of the high-temperature air was controlled to one unit of "air feed quantity".

The heat retention chamber 6 was controlled to have a temperature of less than 60° C. so that the resin particles were cooled.

After passing the heat retention chamber 6, the collected resin particles were transported with air, while being controlled to have a temperature of not greater than 50° C. (the peripheral atmosphere was controlled to have a temperature of not greater than 40° C.), and collected by a dust collector (not shown). The collected resin particles were sieved with a mesh.

The conditions of the apparatus 100 and the properties of the resultant resin particles in Example 1 and Comparative Examples 1 to 3 are shown in Tables 1 and 2, respectively.

TABLE 1

|  | Example 1 | Comparative Example 1 | Comparative Example 2 | Comparative Example 3 |
|---|---|---|---|---|
| Raw material | A | A | A | A |
| High-temperature air (° C.) | 240 | 60 | 240 | 110 |
| Heat retention chamber (° C.) | 200 | 38 | 57 | 62 |
| Feeder A | Without | Without | Without | Without |
| Feeder B | Without | Without | Without | Without |
| Static mixer | Without | Without | Without | Without |
| Pressure control means | Without | Without | Without | Without |
| Pressure gauge 11 (MPa) | 2.6 | 2.7 | 2.6 | 2.6 |
| Pressure gauge 12 (MPa) | 3 | 3.1 | 3 | 3 |
| Gear pump | Without | Without | Without | Without |

TABLE 2

|  | Example 1 | Comparative Example 1 | Comparative Example 2 | Comparative Example 3 |
|---|---|---|---|---|
| Product condition before sieving | Fine particles | Fibers immixed with fine particles | Fine particles immixed with short fibers | Fine particles immixed with short fibers |
| Passage rate with 400-mesh sieve (%) | 75 | 5 | 54 | 43 |

TABLE 2-continued

|  | Example 1 | Comparative Example 1 | Comparative Example 2 | Comparative Example 3 |
|---|---|---|---|---|
| Weight average particle diameter of sieved particles (μm) | 7.9 | 11.3 | 10.9 | 11.1 |
| Volume-based CV value of sieved particles (μm) | 30 | 36 | 33 | 35 |
| Average circularity (measured by FPIA-2100) | 0.972 | 0.913 | 0.935 | 0.921 |

Resin particles having a passage rate with a 400-mesh sieve of greater than 60%, a weight average particle diameter of sieved particles of less than 10 μm, and an average circularity of not less than 0.95 are acceptable as a toner.

Examples 2 to 8 and 12

A nozzle unit (1) including 750 pieces of a circular nozzle opening having an opening diameter of 160 μm was set in the apparatus 100 for manufacturing a particulate resin illustrated in FIG. 1. The pitch distance between the nozzle openings was about 0.6 mm. The nozzle openings were arranged in line and slit-like gas nozzles, configured to provide high-temperature air, were arranged in parallel across the nozzle openings as illustrated in FIG. 3.

The inner walls of the resin flow paths from the base compound feeder 1 to immediately before the atomization device 3 were controlled to have a temperature of 160° C., and that of the atomization device 3 was controlled to have a temperature of 200° C. The high-temperature air was controlled to have a temperature of 240° C.

The throughput per nozzle opening was controlled to one unit of "raw-material throughput". The feed quantity of the high-temperature air was controlled to one unit of "air feed quantity".

In this embodiment, the heat retention chamber 6 had a temperature of from 190 to 210° C. The retention time in the heat retention chamber 6 was about two seconds, determined according to the method defined in the present invention.

After passing the heat retention chamber 6, the collected resin particles were transported with air, while being controlled to have a temperature of not greater than 50° C. (the peripheral atmosphere was controlled to have a temperature of not greater than 40° C.), and collected by a dust collector (not shown). The collected resin particles were sieved with a mesh.

The conditions of the apparatus 100 and the properties of the resultant resin particles in Examples 2 to 8 and 12 are shown in Tables 3 and 4, respectively.

The gear pump 4, the static mixer 5, and a pressure control means were attached to/detached from the apparatus 100 as described in Table 3.

TABLE 3

|  | Ex. 2 | Ex. 3 | Ex. 4 | Ex. 5 | Ex. 6 | Ex. 7 | Ex. 8 | Ex. 12 |
|---|---|---|---|---|---|---|---|---|
| Raw material | A | A | A | A | A | A + a (5 parts) | A | A |
| High-temperature air (° C.) | 240 | 240 | 240 | 240 | 240 | 240 | 240 | 125 |
| Heat retention chamber (° C.) | 200 | 200 | 200 | 200 | 200 | 200 | 200 | 62 |
| Feeder A (feeding substance) | Without | With (10 parts of a(*)) | With (1 part of b(**)) | With (1 part of b) | Without | Without | With (5 parts of a) | Without |
| Feeder B (feeding substance) | Without | Without | Without | Without | With (1 part of b) | With (1 part of b) | With (1 part of b) | Without |
| Static mixer | Without | Without | Without | Without | With | With | With | Without |
| Pressure control means | Without | Without | Without | With | With | With | With | Without |
| Pressure gauge 11 (MPa) | 2.6 | 2.2 | 1.9 | 7.8 | 7.9 | 7.1 | 7.1 | 2.6 |

TABLE 3-continued

| | Ex. 2 | Ex. 3 | Ex. 4 | Ex. 5 | Ex. 6 | Ex. 7 | Ex. 8 | Ex. 12 |
|---|---|---|---|---|---|---|---|---|
| Pressure gauge 12 (MPa) | 3 | 2.6 | 2.3 | 8.1 | 8.1 | 7.4 | 7.4 | 3 |
| Gear pump | With | With | With | With | With | With | With | Without | a(*) Carnauba wax
b(**) Carbon dioxide gas

TABLE 4

| | Ex. 2 | Ex. 3 | Ex. 4 | Ex. 5 | Ex. 6 | Ex. 7 | Ex. 8 | Ex. 12 |
|---|---|---|---|---|---|---|---|---|
| Product condition before sieving | Fine particles | Fine particles | Fine particles | Fine particles | Fine particles | Fine particles | Fine particles | Fine particles |
| Passage rate with 400-mesh sieve (%) | 81 | 87 | 89 | 94 | 94 | 96 | 96 | 67 |
| Weight average particle diameter of sieved particles (μm) | 7.9 | 6.8 | 6.6 | 6.3 | 6.2 | 5.5 | 5.6 | 9.8 |
| Volume-based CV value of sieved particles (μm) | 22 | 23 | 19.8 | 14.1 | 14.6 | 9.7 | 9.5 | 30 |
| Average circularity (measured by FPIA-2100) | 0.973 | 0.978 | 0.972 | 0.976 | 0.972 | 0.983 | 0.988 | 0.959 |

Compared to Example 1, an embodiment of Example 2 further includes a gear pump for controlling the flow rate of a resin. By keeping the revolution of the gear pump constant, the flow rate of the resin may be kept constant. In this embodiment, the passage rate with a sieve increases, the average particle diameter decreases, and the CV value decreases, compared to Example 1. These results indicate that the dispersion was very well performed. On the other hand, the average circularity does not change. It seems that the flow rate of the resin was precisely controlled by the gear pump, resulting in providing a stable extrusion output of the resin. It also appears that the dispersion was stably performed and coarse and ultrafine particles were hardly produced, resulting in decreasing the CV value.

Compared to Example 2, an embodiment of Example 3 further includes a feeder A to feed 10 parts of the substance (a) (carnauba wax). In this embodiment, the passage rate with a sieve increases, and the average particle diameter decreases, compared to Example 2. These results indicate that the dispersion was very well performed. This is because the melted resin liquid had a lower viscosity compared to that of Example 2 when passing the nozzle openings due to including a larger amount of the wax. The fact that the pressure gauge 12 indicated the lower pressure also indicates that the melted resin liquid had a lower viscosity compared to that of Example 2.

Compared to Example 2, an embodiment of Example 4 further includes a feeder A to feed 1 part of the substance (b) (carbon dioxide wax). In this embodiment, the passage rate with a sieve increases, and the average particle diameter decreases, compared to Example 2. These results indicate that the dispersion was very well performed. This is because the melted resin included fine bubbles when passing the nozzle openings.

Compared to Example 4, the substance (b) is in a supercritical state when fed into and mixed with a resin in an embodiment of Example 5. In this embodiment, the passage rate with a sieve increases, and the average particle diameter and the CV value modestly decrease, i.e., the resultant resin particles are finer and have a narrower particle diameter distribution compared to Example 4. These results indicate that the substance (b) in a supercritical state was highly uniformly dispersed in a resin. Therefore, fine and uniform bubbles were formed in the resin, resulting in performing a uniform and stable dispersion.

Compared to Example 5, the feeder A is replaced with a feeder B to feed the substance (b) in an embodiment of Example 6. This embodiment further includes the static mixer 5 to mix the substance (b) with a resin. The properties of the resultant particles in Example 6 show no difference from those in Example 5, while the operability of the base compound feeder in Example 6 was increased.

Compared to Example 6, 5 parts of the substance (a) is fed into the base compound feeder together with the raw material (A) in an embodiment of Example 7. In this embodiment, the passage rate with a sieve increases, and the average particle diameter and the CV value decrease. These results indicate that the dispersion was very well performed due to including the wax.

Compared to Example 7, an embodiment of Example 8 further includes the feeder A to feed 5 parts of the substance (a), instead of feeding the substance (a) together with the raw material (A). The properties of the resultant particles in Example 8 show no difference from those in Example 7. The results of Examples 7 and 8 indicate that a combination of a supercritical liquid (substance (b)) and the static mixer can produce resin particles having desired properties with an easy operation.

Compared to Example 1, the temperatures of the high-temperature air and the heat retention chamber are changed in an embodiment of Example 12. The results of Example 12 indicate that the resultant resin particles have a desired particle diameter when controlling these temperatures within an appropriate range.

Example 9

The procedure in Example 8 was repeated except that the nozzle unit (1) was replaced with a nozzle unit (2) including 750 pieces of a circular nozzle opening having an opening diameter of 160 μm, which were arranged in a circle, and ring-like gas nozzles as illustrated in FIG. 4. The ring-like gas nozzles, configured to provide high-temperature air, have the same width (i.e., clearance) as the slit-like gas nozzles of Example 8. The pitch distance between the nozzle openings was the same as that of Example 8. The distance between the gas nozzles and the nozzle openings were also the same as those of Example 8. By circularly reconfiguring the nozzle openings and the gas nozzles in the embodiment of Example 8, an embodiment of Example 9 can be obtained.

The conditions of the apparatus 100 and the properties of the resultant resin particles in Example 9 are shown in Tables 5 and 6, respectively.

TABLE 5

|  | Example 9 |
|---|---|
| Raw material | A |
| High-temperature air (° C.) | 240 |
| Heat retention chamber (° C.) | 200 |
| Feeder A | With |
|  | (5 parts of a$^{(*)}$) |
| Feeder B | With |
|  | (1 part of b$^{(**)}$) |
| Static mixer | With |
| Pressure control means | With |
| Pressure gauge 11 (MPa) | 7.1 |
| Pressure gauge 12 (MPa) | 7.4 |
| Gear pump | With | a$^{(*)}$ Carnauba wax
b$^{(**)}$ Carbon dioxide gas

TABLE 6

|  | Example 9 |
|---|---|
| Product condition before sieving | Fine particles |
| Passage rate with 400-mesh sieve (%) | 96 |
| Weight average particle diameter of sieved particles (μm) | 5.6 |
| Volume-based CV value of sieved particles (μm) | 9.6 |
| Average circularity (measured by FPIA-2100) | 0.987 |

Examples 10 and 11

The procedures in Examples 1 and 8 were repeated, respectively, except that the nozzle unit (1) was replaced with a nozzle unit (3) including a slit-like nozzle opening as illustrated in FIG. 5. The slit-like nozzle opening had a width of 160 μm and a length of 120 mm. Slit-like gas nozzles, configured to provide high-temperature air, have the same width (i.e., clearance) as those of Example 1, and 4/15 times the length of those of Example 1.

The throughput of the apparatus 100 was controlled to 750 units of "raw-material throughput" so that the total throughput is the same as Example 1. In this case, the feed quantity of the high-temperature air was reduced to 0.82 units of "air feed quantity". This indicates that the feed quantity of the air per unit amount of raw material is decreased, resulting in improving the energy efficiency.

The conditions of the apparatus 100 and the properties of the resultant resin particles in Examples 10 and 11 are shown in Tables 7 and 8, respectively.

TABLE 7

|  | Example 10 | Example 11 |
|---|---|---|
| Raw material | A | A |
| High-temperature air (° C.) | 240 | 240 |
| Heat retention chamber (° C.) | 200 | 200 |
| Feeder A | Without | With |
|  |  | (5 parts of a$^{(*)}$) |
| Feeder B | Without | With |
|  |  | (1 part of b$^{(**)}$) |
| Static mixer | Without | With |
| Pressure control means | Without | With |
| Pressure gauge 11 (MPa) | 2.4 | 7.1 |
| Pressure gauge 12 (MPa) | 2.8 | 7.6 |
| Gear pump | Without | With | a$^{(*)}$ Carnauba wax
b$^{(**)}$ Carbon dioxide gas

TABLE 8

|  | Example 10 | Example 11 |
|---|---|---|
| Product condition before sieving | Fine particles | Fine particles |
| Passage rate with 400-mesh sieve (%) | 75 | 95 |
| Weight average particle diameter of sieved particles (μm) | 7.9 | 5.8 |
| Volume-based CV value of sieved particles (μm) | 31 | 9.7 |
| Average circularity (measured by FPIA-2100) | 0.970 | 0.986 |

This document claims priority and contains subject matter related to Japanese Patent Applications Nos. 2006-305116 and 2007-266525, filed on Nov. 10, 2006 and Oct. 12, 2007, respectively, the entire contents of each of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An apparatus for manufacturing a particulate resin, comprising:
   a fine nozzle opening configured to extrude a melted resin mixture comprising a resin;
   an extrusion output control mechanism configured to control an extrusion output of the melted resin mixture;

a collision mechanism configured to collide the melted resin mixture extruded from the fine nozzle opening with a high-temperature gas stream having a temperature of not less than a $T_{1/2}$ temperature of the resin, so that the melted resin mixture is granulated to provide a particulate resin;

a heat retention mechanism configured to retain the particulate resin in an atmosphere having a temperature of not less than a Tg of the resin for 0.1 to 10 seconds;

a cooling mechanism configured to cool the particulate resin; and a feeding mechanism configured to feed a second substance into the melted resin mixture before the melted resin mixture is extruded from the fine nozzle opening.

2. The apparatus for manufacturing a particulate resin according to claim 1, further comprising a mixing mechanism configured to mix the second substance with the melted resin mixture after the second substance is fed into the melted resin mixture.

3. The apparatus for manufacturing a particulate resin according to claim 2, wherein the mixing mechanism is a screw comprising a kneading mechanism.

4. The apparatus for manufacturing a particulate resin according to claim 2, wherein the mixing mechanism is a static mixer.

5. The apparatus for manufacturing a particulate resin according to claim 1, wherein the extrusion output control mechanism is a gear pump.

6. The apparatus for manufacturing a particulate resin according to claim 1, further comprising a plurality of fine nozzle openings.

7. The apparatus for manufacturing a particulate resin according to claim 6, wherein the high-temperature gas stream is shared among a plurality of the fine nozzle openings.

8. The apparatus for manufacturing a particulate resin according to claim 7, wherein a plurality of the fine nozzle openings are arranged in a line.

9. The apparatus for manufacturing a particulate resin according to claim 7, wherein a plurality of the fine nozzle openings are arranged in a circle.

10. The apparatus for manufacturing a particulate resin according to claim 7, wherein each of a plurality of the fine nozzle openings has a circular equivalent opening diameter of from 100 to 500 μm.

11. The apparatus for manufacturing a particulate resin according to claim 1, wherein the fine nozzle opening has a slit-like shape having a width of from 50 to 400 μm.

12. The apparatus for manufacturing a particulate resin according to claim 11, wherein the slit-like fine nozzle opening has a substantially circular shape.

13. The apparatus for manufacturing a particulate resin according to claim 1, further comprising gas feeding openings configured to feed the high-temperature gas stream, provided on opposing corners across the fine nozzle opening.

14. The apparatus for manufacturing a particulate resin according to claim 7, further comprising gas feeding openings configured to feed the high-temperature gas stream, provided on opposing corners across a plurality of the fine nozzle openings, wherein each of a plurality of the fine nozzle openings has a circular equivalent opening diameter of from 100 to 500 μm.

15. The apparatus for manufacturing a particulate resin according to claim 11, further comprising gas feeding openings configured to feed the high-temperature gas stream, provided on opposing corners across the fine nozzle opening.

16. A method for manufacturing a particulate resin, comprising:

extruding a melted resin mixture from a fine nozzle opening;

colliding the melted resin mixture extruded from the fine nozzle opening with a high-temperature gas stream having a temperature of not less than a $T_{1/2}$ temperature of the resin, so that the melted resin mixture is granulated to provide a particulate resin;

retaining the particulate resin in an atmosphere having a temperature of not less than a Tg of the resin for 0.1 to 10 seconds; and cooling the particulate resin, wherein a second substance is fed into the melted resin mixture before the melted resin mixture is extruded from the fine nozzle opening.

17. The method for manufacturing a particulate resin according to claim 16, further comprising feeding a second substance into the melted resin mixture before the melted resin mixture is extruded from the fine nozzle opening, wherein the second substance is at least one member selected from a wax and a gas.

18. The method for manufacturing a particulate resin according to claim 3, wherein the second substance is at least one gas selected from the group consisting of carbon dioxide, nitrogen, and butane.

19. The method for manufacturing a particulate resin according to claim 17, wherein the second substance is a gas in a supercritical state when fed into the melted resin mixture.

20. The method for manufacturing a particulate resin according to claim 17, wherein the second substance is a gas that achieves a supercritical state after being mixed with the melted resin mixture.

21. An apparatus for manufacturing a particulate resin, comprising:

a fine nozzle opening configured to extrude a melted resin mixture comprising a resin;

feeding means configured to feed a second substance into the melted resin mixture before the melted resin mixture is extruded from the fine nozzle opening;

extrusion output control means for controlling an extrusion output of the melted resin mixture;

collision means to collide the melted resin mixture extruded from the fine nozzle opening with a high-temperature gas stream having a temperature of not less than a $T_{1/2}$ temperature of the resin, so that the melted resin mixture is granulated to provide a particulate resin;

heat retention means to retain the particulate resin in an atmosphere having a temperature of not less than a Tg of the resin for 0.1 to 10 seconds; and cooling means to cool the particulate resin.

22. A method of manufacturing a toner, comprising:

extruding a melted resin mixture from a fine nozzle opening, wherein a second substance is fed into the melted resin mixture before the melted resin mixture is extruded from the fine nozzle opening;

colliding the melted resin mixture extruded from the fine nozzle opening with a high-temperature gas stream having a temperature of not less than a T½ temperature of the resin, so that the melted resin mixture is granulated to provide a particulate resin;

retaining the particulate resin in an atmosphere having a temperature of not less than a Tg of the resin for 0.1 to 10 seconds; and cooling the particulate resin.

* * * * *